United States Patent [19]

Umeyama et al.

[11] Patent Number: 5,554,082
[45] Date of Patent: Sep. 10, 1996

[54] TRANSMISSION WITH INTEGRAL LARGE AND SMALL PLANETARY GEARS, AND METHOD OF ASSEMBLING THE TRANSMISSION

[75] Inventors: Mitsuhiro Umeyama; Takashi Shimizu; Eiji Ichioka; Kinya Yoshii; Takeharu Koide, all of Toyota; Makoto Funahashi, Susono, all of Japan

[73] Assignee: Toyota Jidosha Kabushiki Kaisha, Toyota, Japan

[21] Appl. No.: 323,805

[22] Filed: Oct. 17, 1994

[30] Foreign Application Priority Data

Oct. 26, 1993 [JP] Japan .................................. 5-267157

[51] Int. Cl.$^6$ .................................................. F16H 1/28
[52] U.S. Cl. .......................... 475/338; 475/339; 475/340; 74/462
[58] Field of Search ..................... 475/338, 339, 475/340; 74/462

[56] References Cited

U.S. PATENT DOCUMENTS

| | | | |
|---|---|---|---|
| 3,721,135 | 3/1973 | Kelley | 475/340 X |
| 3,780,601 | 12/1973 | Dach et al. | 475/340 X |
| 4,928,227 | 5/1990 | Joesph et al. | 364/424.01 |
| 5,376,057 | 12/1994 | Cooper et al. | 475/339 X |

FOREIGN PATENT DOCUMENTS

| | | |
|---|---|---|
| 0463895A1 | 5/1991 | European Pat. Off. . |
| 1356792 | 2/1964 | France .................................. 475/339 |
| 912884 | 6/1954 | Germany .............................. 475/340 |
| 5-332408 | 12/1993 | Japan . |
| 5-332408 | 12/1993 | Japan .................................... 475/339 |
| 364954 | 11/1962 | Switzerland ........................... 475/339 |
| 2249364 | 5/1992 | United Kingdom ................... 475/340 |

OTHER PUBLICATIONS

"ETX–II Automatic Transaxle for AC Powered Light Trucks" disclosed by P.T. Koneda, Ford Motor Company. in EVZ 9 (Nov. 13–16, 1988.

Automobile Engineering, Railroad Japan, Inc., May 1992, pp. 91–94.

Primary Examiner—Khoi Q. Ta
Attorney, Agent, or Firm—Oblon, Spivak, McClelland, Maier & Neustadt, P.C.

[57] ABSTRACT

A transmission including composite planetary gears supported by a carrier such that the planetary gears are arranged around an axis of the carrier, each planetary gear consisting of a large and a small pinion which mesh with a first and a second gear, respectively, and which have a ratio $Zp_1/Zp_2$ equal to an integer not smaller than 2, wherein $Zp_1$ and $Zp_2$ represent numbers of teeth of the large and small pinions, respectively. The transmission is assembled by assembling the common second gear and the carrier supporting the planetary gears, such that the small pinion of each composite planetary gear meshes with the common second gear, and assembling the common first gear and the carrier such that the large pinion of each planetary gear supported by the carrier meshes with the common first gear.

12 Claims, 5 Drawing Sheets

TRANSMISSION WITH INTEGRAL LARGE AND SMALL PLANETARY GEARS, AND METHOD OF ASSEMBLING THE TRANSMISSION

BACKGROUND OF THE INVENTION

1. Field of the Invention

The present invention relates in general to a planetary gear type transmission which includes composite planetary gears each having integral large and small pinions. More particularly, this invention is concerned with such a planetary gear type transmission which is constructed for easy and efficient assembling without reducing the strength or durability of the small pinions and without increasing its size, and is also concerned with a method of assembling the transmission. The invention is also concerned with a method which permits easy and efficient assembling of such a transmission.

2. Discussion of the Related Art

As a transmission used on a motor vehicle, for example, there is known a transmission of the type in which a plurality of composite planetary gears are arranged around the shaft of a carrier. Each of the composite planetary gears consists of a large pinion and a small pinion which has a smaller diameter than the large pinion and which is integral with the large pinion for rotation therewith. The large pinions of the composite planetary gears mesh with a common first gear, while the small pinions mesh with a common second gear. Examples of this type of planetary gear type transmission are disclosed in U.S. Pat. No. 4,928,227 to Joseph C. Burbs et al., laid-open Publication JP-A-5-332408 of unexamined Japanese Patent Application No. 4-157513, and Japanese Patent Application No. 5-132935. The transmissions disclosed in these publications are adapted to be used as a speed reduction gear for an electric vehicle.

Referring to the cross sectional view of FIG. 1, there is shown the transmission disclosed in Japanese Patent Application No. 5-132935, wherein the transmission is indicated generally at 10. This transmission 10 includes a sun gear 18 fixed at one axial end of a shaft 16 of a power source in the form of an electric motor, so that the sun gear 18 rotates with the motor shaft 16. The transmission 10 further includes a plurality of (e.g., three) composite planetary gears 24 rotatably mounted on respective pinion shafts 21, and a ring gear 30 secured to a housing 28. The pinion shafts 21 are supported by a carrier 20, and the composite planetary gears 24 are arranged around the axis of the carrier 20. The sun gear 18 and the ring gear 30 are coaxial with the carrier 20, and are rotatable about the axis of the carrier 20. Each of the composite planetary gears 24 consists of a large pinion 22, and a small pinion 26 which has a smaller diameter than the large pinion 22 and which is integral with the large pinion 22. The large pinions 22 of the composite planetary gears 24 mesh with a first gear in the form of the sun gear 18, while the small pinions 26 mesh with a second gear in the form of the ring gear 30.

A rotary motion of the motor shaft 16 received by the sun gear 18 is transmitted to the carrier 20 at a predetermined speed ratio "i", and the rotary motion of the carrier 20 is transmitted to a differential gear 32. The speed ratio "i" is defined as the rotating speed of the sun gear 18 divided by the rotating speed of the carrier 20, and is expressed by the following equation (1):

$$i = 1 + Zp_1 \cdot Zr / Zs \cdot Zp_2 \qquad (1)$$

where, $Zp_1$: number of teeth of the large pinion 22, $Zr$: number of teeth of the ring gear 30, $Zs$: number of teeth of the sun gear 18, $Zp_2$: number of teeth of the small pinion 26

Thus, the sun gear 18 and the carrier 20 operate as the input and output members of the transmission 10, respectively.

The differential gear 32 is a double-pinion type planetary gear device which includes a ring gear 34, a carrier 36 and a sun gear 38. The ring gear 34 is adapted to receive power from the carrier 20, and the power received by the ring gear 34 is distributed to the carrier 36 and the sun gear 38, and transmitted to right and left drive wheels of a vehicle through respective axles 40, 42.

In a transmission having composite planetary gears as described above, the diameters of the large and small pinions are determined depending upon a desired speed ratio of the transmission. If the large and small pinions have different numbers of teeth, it is generally difficult and time-consuming to assemble the carrier and the first and second gears, such that the large pinion of each composite planetary gear supported by the carrier meshes with the first gear, while the small pinion of each composite planetary gear meshes with the second gear. Taking the transmission 10 shown in FIG. 1, for example, first and second planetary gears of the three planetary gears 24 are indicated at 24a, 24b in FIG. 5, wherein the large and small pinions 22, 26 of the planetary gears 24 correctly mesh with the sun gear 18 and the ring gear 30. However, the two teeth of the small pinion 26 of the first planetary gear 24a which are next adjacent to the tooth correctly and fully meshing with the appropriate adjacent teeth of the ring gear 30 are not aligned or matched with the center of any tooth of the large pinion 22, with a certain amount of angular phase shift or difference as indicated in FIG. 5. If one of those two teeth of the small pinion 26 of the first planetary gear 24a is brought into correct full meshing engagement with the appropriate adjacent teeth of the ring gear 30, the large pinion 22 of the first planetary gear 24a cannot mesh with the sun gear 18, as indicated by dashed line in FIG. 5, unless the angular position of the sun gear 18 is changed, that is, unless the meshing positions of the other planetary gears including the second gear 24b are changed with respect to the sun gear 18 and ring gear 30. Where the small pinions 26 of the planetary gears 24 are engaged with the ring gear 30 before the large pinions 22 are engaged with the sun gear 18, the small pinions 26 of all the planetary gears 24 should be initially engaged with the ring gear 30 with predetermined correct angular phases with the ring gear 30, so that the large pinions 22 can be thereafter correctly engaged with the sun gear 18. Where the small pinions 26 of the planetary gears 24 are engaged with the ring gear 30 after the large pinions 22 are engaged with the sun gear 18, the large pinions 22 of all the planetary gears 24 should be initially engaged with the sun gear 18 with predetermined correct angular phases with the sun gear 18, so that the small pinions 26 can be thereafter correctly engaged with the ring gear 30.

If the large and small pinions of each composite planetary gear have the same number of teeth, all teeth of the large pinion have the same angular phase with the corresponding teeth of the small pinion. In this case, the composite planetary gears, sun gear and ring gear can be readily assembled without considering the angular phases or relationships with each other, irrespective of whether the large pinions are engaged with the first gear before or after the small pinions are engaged with the second gear. On the other hand, however, the module of the small pinions should be considerably smaller than that of the large pinions, since the diameter of the small pinions should be considerably smaller than that of the large pinions. Accordingly, the small pinions tend to have reduced strength and durability. In this respect, it is noted that the meshing load acting on the teeth of the small pinions is greater than that of the large pinions, by an amount corresponding to a difference of the diameters of the large and small pinions. Therefore, where the composite planetary gears are subject to a suddenly changing torque as in an automobile transmission, for example, the use of the small pinions having a small module is not desirable. If the diameter of the small pinions is increased to reduce the module to such an extent as to assure sufficient strength and durability of the small pinions, the large pinions and the other gears should have accordingly increased diameters, inherently leading to an increased overall size of the transmission.

SUMMARY OF INVENTION

It is therefore an object of the present invention to provide a planetary gear type transmission including a plurality of composite planetary gears each consisting of a large pinion and a small pinion integral with the large pinion, which transmission is constructed for easy and efficient assembling without reducing the strength or durability of the small pinions and without increasing its size.

It is a second object of the present invention to provide a method by which the transmission of the type indicated above can be easily and efficiently assembled without reducing the strength or durability of the small pinions and without increasing the size of the transmission.

The first object indicated above can be achieved according to one aspect of the present invention to provide a planetary gear type transmission including a plurality of composite planetary gears supported by a carrier such that the composite planetary gears are arranged around an axis of the carrier, each of the composite planetary gears consisting of a large pinion meshing with a common first gear, and a small pinion which has a smaller diameter than the large pinion and which meshes with a common second gear, wherein the large and small pinions have a ratio $Zp_1/Zp_2$ which is equal to an integer not smaller than 2, $Zp_1$ and $Zp_2$ representing numbers of teeth of the large and small pinions, respectively.

In the transmission of the present invention constructed as described above, each tooth of the small pinion of each composite planetary gear is aligned with an appropriate one of the teeth of the large pinion when any one of the teeth of the small pinion correctly and fully meshes with a given tooth of the second gear. According to this arrangement, the common first gear and the carrier supporting the plurality of composite planetary gears can be correctly assembled such that the large pinions of all the composite planetary gears mesh with the common first gear, if the common second gear and the carrier are simply assembled for meshing engagement of the small pinions of the planetary gears with the common second gear, without considering the angular phases or relationships of the individual small pinions with respect to the common second gear. In other words, there are no specific angular phases or positions of the small pinions with respect to the common second gear, that should be established when the small pinions are engaged with the second gear.

Since the number $Zp_2$ of teeth of the small pinion of each composite planetary gear is smaller than the number $Zp_1$ of the large pinion, the small pinion can have the same module as the large pinion, by forming the small pinion with a diameter smaller than that of the large pinion. For example, where the diameter of the small pinion is one half of that of the large pinion, the small and large pinions have the same module when the number $Zp_2$ of teeth of the small pinion is one half of the number $Zp_1$ of the large pinion. Accordingly, the small pinion used in the present invention can have a larger module than in the case where the small and large pinions have the same number of teeth. The comparatively large module of the small pinion results in accordingly increased strength and durability of the small pinion, and eliminates a need of increasing the diameter of the small pinion to provide the strength and durability sufficient to withstand the comparatively large meshing load.

Thus, the present transmission can be easily and efficiently assembled with the small pinions being engaged with the second gear before the large pinions are engaged with the first gear. Further, the present transmission can be made compact, and can be manufactured so as to assure sufficient strength and durability of the small pinions.

The second object indicated above may be achieved according to a second aspect of this invention, which provides a method of assembling a planetary gear type transmission including a plurality of composite planetary gears supported by a carrier such that the composite planetary gears are arranged around an axis of the carrier, each of the composite planetary gears consisting of a large pinion meshing with a common first gear, and a small pinion which has a smaller diameter than the large pinion and which meshes with a common second gear, the method comprising the steps of: (a) preparing the large pinion and the small pinion of each composite planetary gear such that the large and small pinions have a ratio $Zp_1/Zp_2$ which is equal to an integer not smaller than 2, wherein $Zp_1$ and $Zp_2$ represent numbers of teeth of the large and small pinions, respectively; (b) assembling the common second gear and the carrier supporting the plurality of composite planetary gears, such that the small pinion of each composite planetary gear meshes with the common second gear; and (c) assembling the common first gear and the carrier such that the large pinion of the each composite planetary gear supported by the carrier meshes with the common first gear.

In the present method, the ratio $Zp_1/Zp_2$ of the number $Zp_1$ of teeth of the large pinion to the number $Zp_2$ of the small pinion is equal to 2 or any other integer larger than 2. Therefore, the large pinions of all the composite planetary gears can be correctly engaged with the first gear by previously positioning the small pinions of the planetary gears for meshing engagement with the second gear. The present method permits easy and efficient assembling of the transmission, without reducing the strength or durability of the small pinions and without increasing the size of the transmission.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
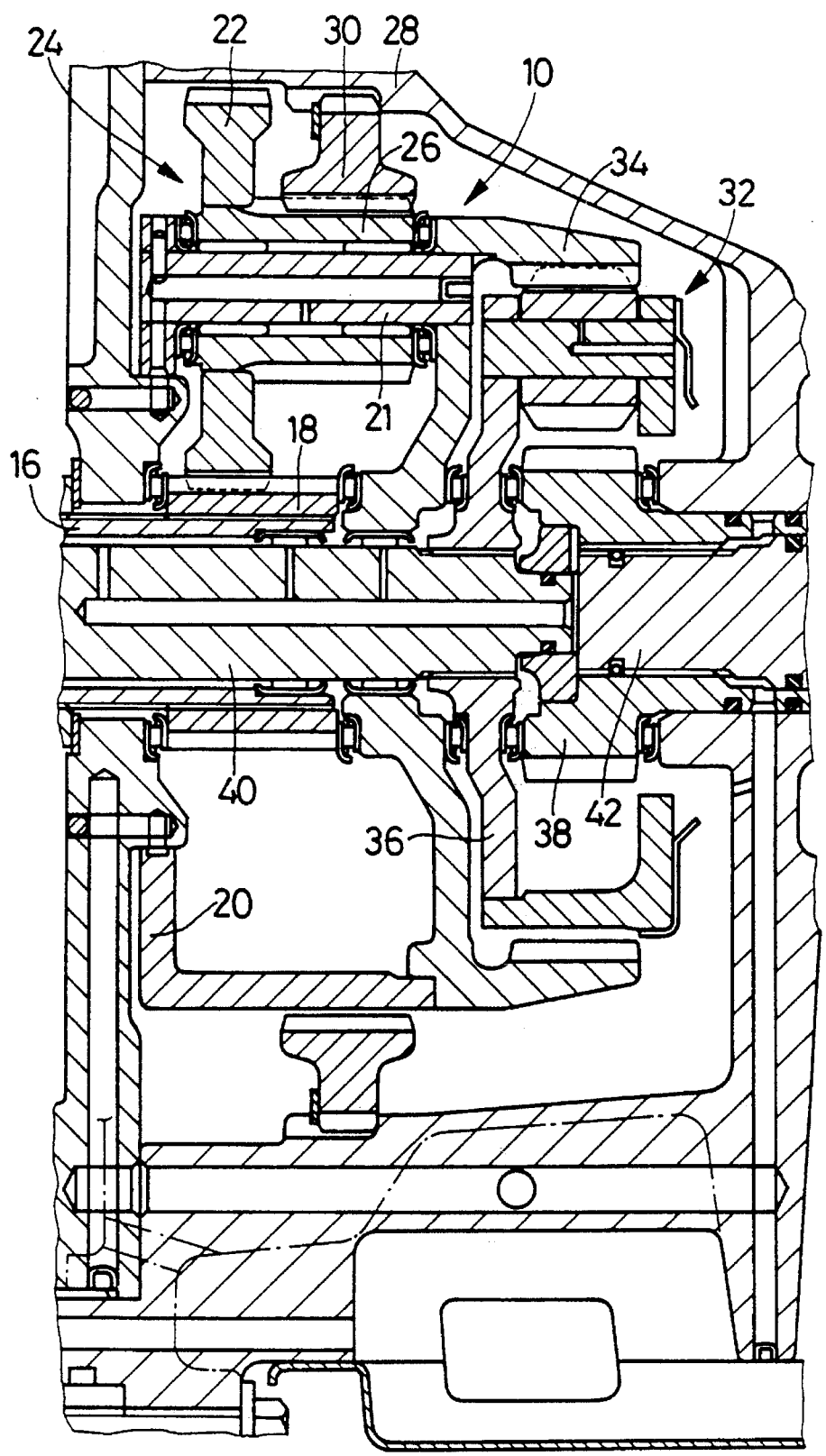
FIG. 1 is an elevational view in cross section of a transmission constructed according to one embodiment of the present invention.
Figure 2:
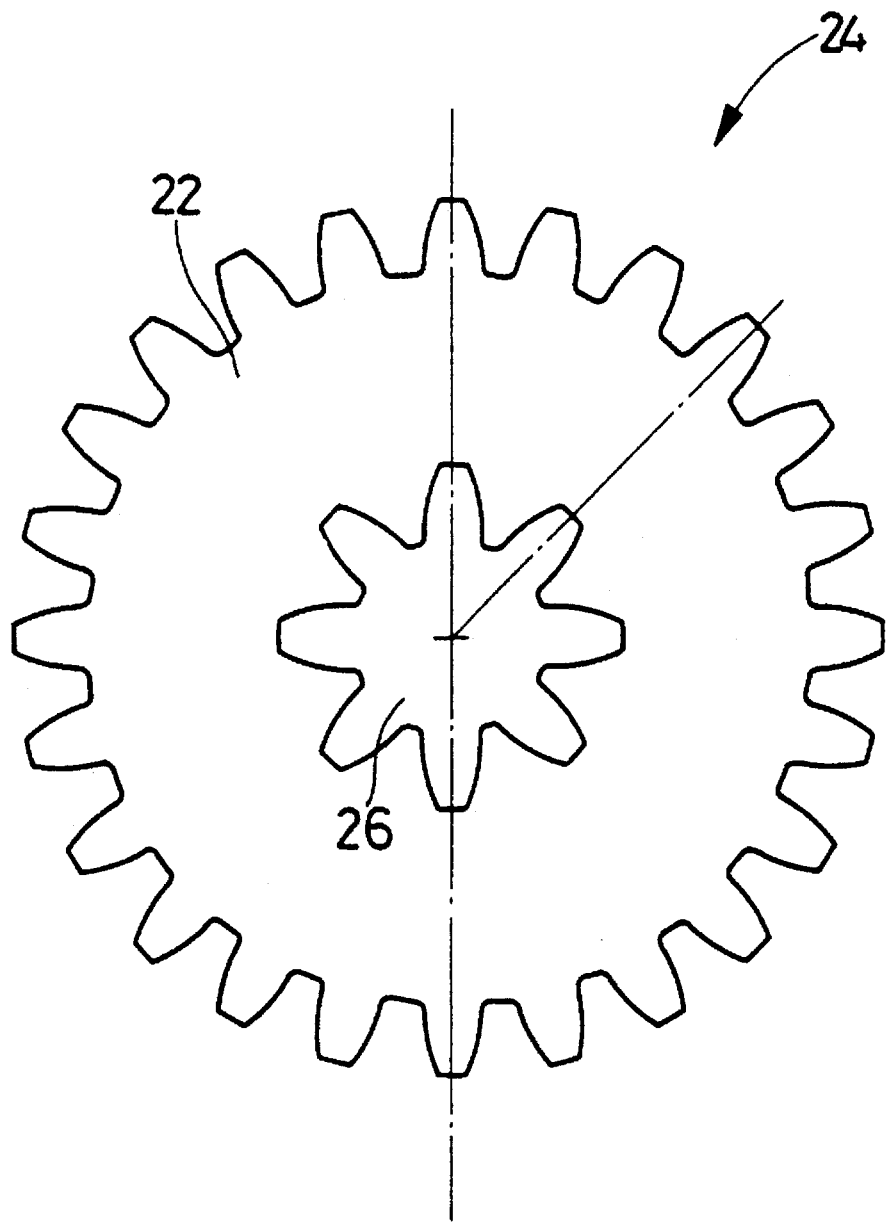
FIG. 2 is a view illustrating a composite planetary gear used in the transmission of FIG. 1, wherein large and small pinions are formed according to the principle of the invention.

Referring first to FIG. 2 showing one of a plurality of composite planetary gears 24 used in the transmission 10 shown in FIG. 1, the composite planetary gear 24 consists of a large pinion 22 whose number of teeth is equal to $Zp_1$, and a small pinion 26 whose number of teeth is equal to $Zp_2$. These numbers $Zp_1$ and $Zp_2$ are determined so that the ratio $Zp_1/Zp_2$ is an integer not smaller than 2. In this specific example, the large pinion 22 has 24 teeth, while the small pinion 26 has 8 teeth. Hence, the ratio $Zp_1/Zp_2$ of the large and small pinions 22, 26 is equal to 24/8=3. As is apparent from FIG. 2, each of the 8 teeth of the small pinion 26 is aligned with an appropriate one of the 24 teeth of the large pinion 22 in the circumferential direction of the pinions 26, 22.

Figure 3:
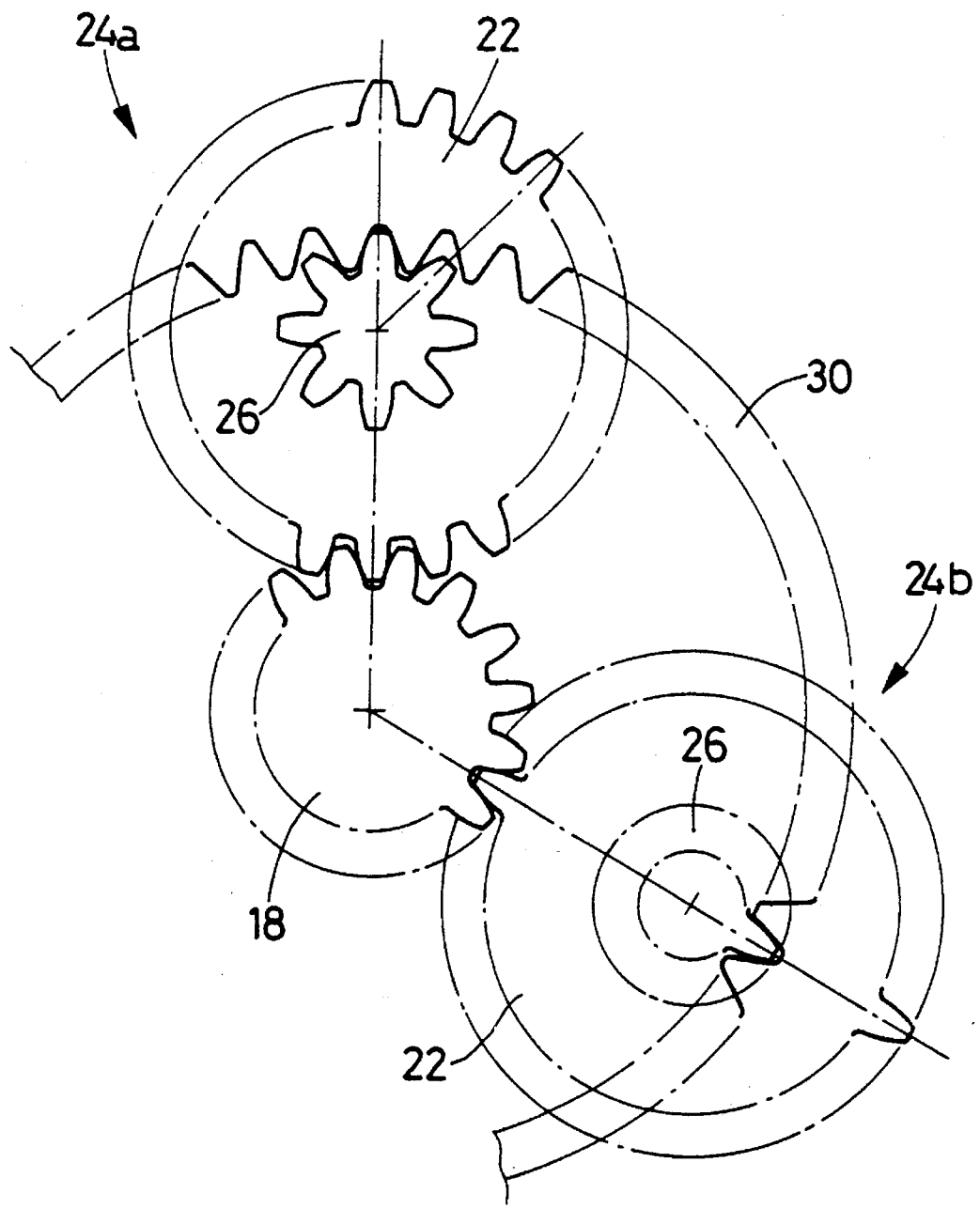
FIG. 3 is a view showing two composite planetary gears meshing with a ring gear and a sun gear of the transmission of FIG. 1.

Two composite planetary gears 24a, 24b each constructed as shown in FIG. 2 are shown in FIG. 3. The large and small pinions 22, 26 of the planetary gears 24a, 24b shown are placed in correctly meshing engagement with the sun gear 18 and the ring gear 30, respectively. Since each tooth of the small pinion 26 of the planetary gear 24a, for example, is aligned with the appropriate one of the teeth of the large pinion 22 of the same planetary gear 24a, the correct meshing engagement can be established irrespective of the tooth of the small pinion 26 which meshes with the ring gear 30. For instance, the correct meshing engagement can be established even when one of the two teeth next adjacent to the tooth of the small pinion 26 now meshing with the ring gear 30 is engaged with the ring gear 30 upon assembling the planetary gears 24a, 24b and the sun and ring gears 18, 30. In other words, the position of the tooth of the large pinion 22 which fully meshes with the sun gear 18 remains constant or unchanged irrespective of the tooth of the small pinion 26 which meshes with the ring gear 30. This meshing relationship is also true for the planetary gear 24b with respect to the sun and ring gears 18, 30.

In assembling the transmission 10 which includes the composite planetary gears 24 whose ratio $Zp_1/Zp_2$ is an integer not smaller than 2, the ring gear 30 and the carrier 20 which supports the planetary gears 24 are first assembled such that the small pinions 26 of the planetary gears 24 mesh with a common second gear in the form of the ring gear 30. Then, the sun gear 18 and the carrier 20 are assembled such that the large pinions 22 of the planetary gears 24 mesh with a common first gear in the form of the sun gear 18. The large pinions 22 can mesh with the sun gear 18 irrespective of the tooth of the small pinions 26 which mesh with the ring gear 30.

As described above, the composite planetary gears 24 are prepared such that the ratio $Zp_1/Zp_2$ of the large and small pinions 22, 26 is equal to 2 or any other integer larger than 2. The teeth of the pinions 22, 26 formed with the ratio $Zp_1/Zp_2$ being an integer not small than 2 enable the large pinions 22 to mesh with the sun gear 18 after the small pinions 26 are initially engaged with the ring gear 30, upon assembling of the transmission 10. Thus, the assembling can be achieved easily and efficiently, without considering the angular relationship of the small pinions 26 with respect to the ring gear 30. The ratio $Zp_1/Zp_2$ which is an integer not smaller than 2 means that the number $Zp_2$ of teeth of the small pinions 26 is smaller than the number $Zp_1$ of the large pinions 22. Accordingly, the small pinions 26 according to the present invention have a larger module than in the case where the small and large pinions 26, 22 have the same number of teeth, namely, the number $Zp_2$ is equal to the number $Zp_1$. In this respect, the small pinions 26 used in the present transmission 10 have increased strength and durability sufficient to withstand the meshing load acting thereon, which is larger than the meshing load acting on the large pinions 22. Further, the ratio $Zp_1/Zp_2$ determined according to the principle of the invention eliminates a need of increasing the diameter of the small pinions 26 to increase the module, and results in reducing the overall size of the transmission.

In the transmission 10 of FIG. 1 constructed according to the embodiment of the invention which has been described above, the large pinions 22 are engaged with the sun gear 18 while the small pinions 26 are engaged with the ring gear 30, so that a rotary motion received by the sun gear 18 is decelerated and transmitted from the carrier 20 to the differential gear 32. However, the present invention may be otherwise embodied. Modified embodiments of the invention are illustrated in FIGS. 4(a) and 4(b), wherein "O" represents the axis of a transmission, only the upper half of which is shown.

Figure 4A:
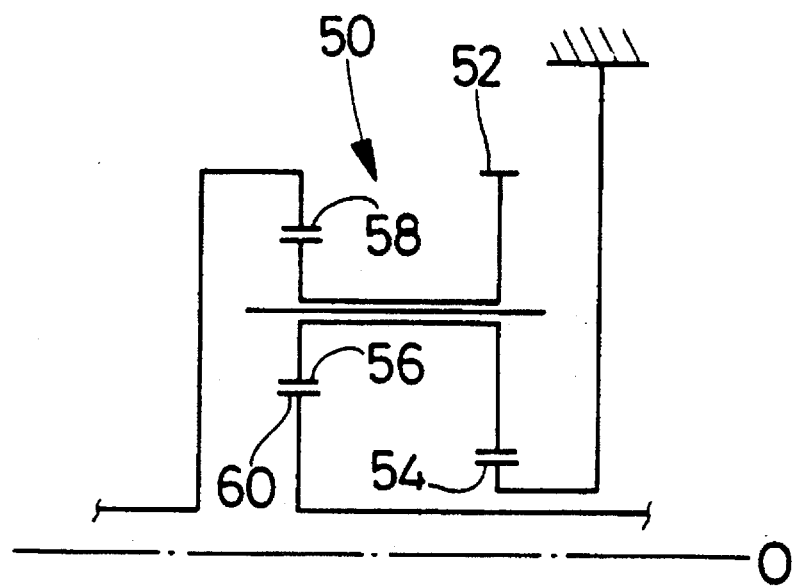
FIGS. 4(a) and 4(b) are schematic views depicting transmissions constructed to other embodiments of the invention.

In the second embodiment of FIG. 4(a), a large pinion 52 of each composite planetary gear 50 meshes with the first gear in the form of a stationary sun gear 54, while a small pinion 56 of the planetary gear 50 meshes with the second gear in the form of a ring gear 58 and a sun gear 60, so that a rotary motion received by the ring gear 58 is decelerated at a predetermined speed reduction ratio, and transmitted through the sun gear 60 to a differential gear or other device. The ring gear 58 and the sun gear 60 operate as the input and output members of the transmission, respectively.

Figure 4B:
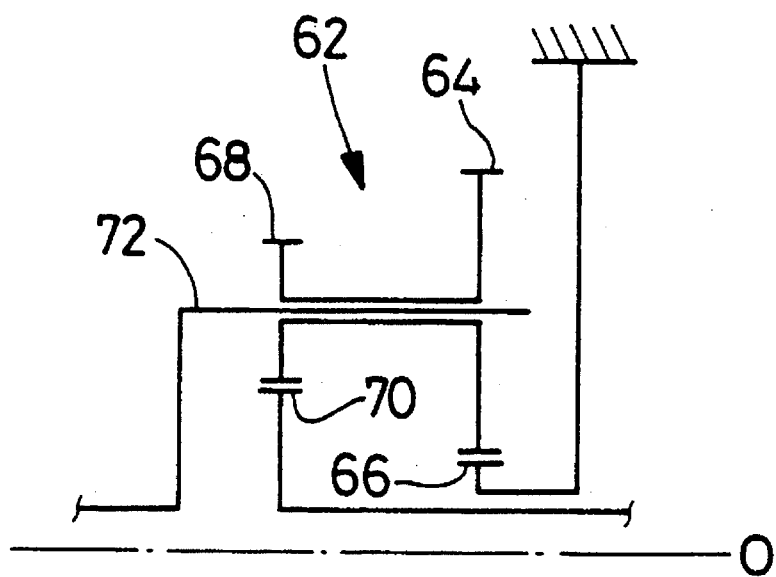
Figure 5:
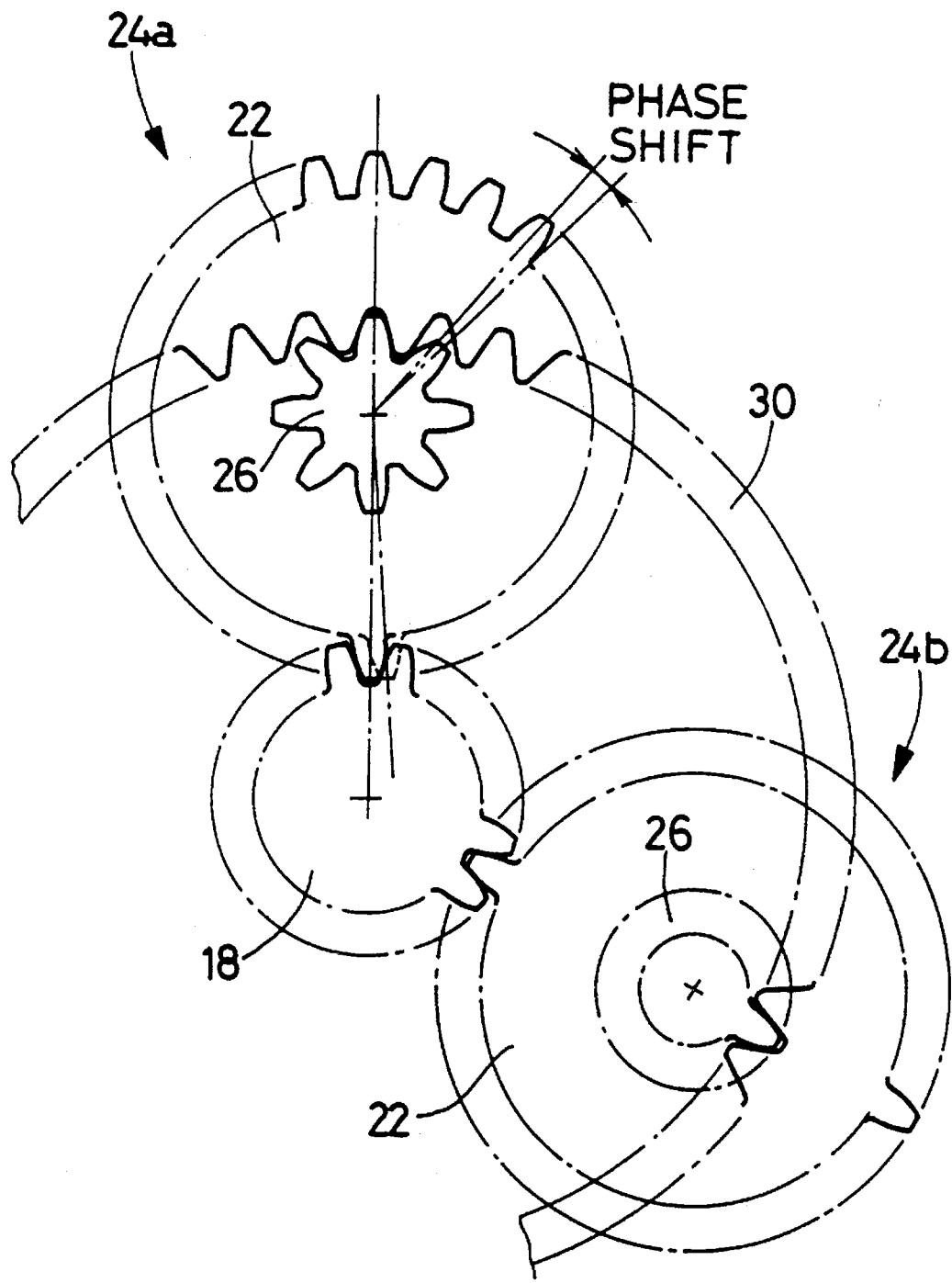
FIG. 5 is a view showing large and small pinions of composite planetary gears meshing with a ring gear and a sun gear, in a known planetary gear type transmission wherein a ratio $Zp_1/Zp_2$ of number $Zp_1$ of teeth of the large pinion to number $Zp_2$ of teeth of the small pinion is not equal to an integer.

In the third embodiment of FIG. 4(b), a large pinion 64 of each composite planetary gear 62 meshes with the first gear in the form of a stationary sun gear 66, while a small pinion 68 of the planetary gear 62 meshes with the second gear in the form of a rotatable sun gear 70, so that a rotary motion received by a carrier 72 is decelerated at a predetermined speed reduction ratio, and transmitted through the sun gear 70 to a differential gear or other device. The carrier 72 and the sun gear 70 operate as the input and output members of the transmission, respectively.

In the second and third embodiments of FIGS. 4(a) and 4(b), too, the large pinions 52, 64 and the small pinions 56, 68 are fabricated so that the ratio $Zp_1/Zp_2$ is equal to an integer not smaller than 2. Accordingly, these modified embodiments provide substantially the same advantages as the first embodiment.

While the present invention has been described in its presently preferred embodiments with a certain degree of particularity, it is to be understood that the invention is not limited to the details of the illustrated embodiments, but may be otherwise embodied.

In the illustrated embodiment of FIG. 2 (FIGS. 1–3), each of the teeth of the small pinion 26 is aligned with the center of the appropriate one of the teeth of the large pinion 22 in the circumferential direction of the pinions. However, the teeth of the small and large pinions 26, 22 may have other angular relationships. For example, the composite planetary gear 24 may be fabricated such that each of the teeth of the small pinion 26 is aligned with the center of the appropriate one of the bottoms between the adjacent teeth of the large pinion 22.

Although the transmission according to the illustrated embodiments is adapted to transmit the input rotary motion at a predetermined constant speed reduction ratio, the transmission may be constructed to have two or more speed reduction ratios, which are established by clutches and brakes as well known in the art. Further, the transmission may be adapted so that the output speed is higher than the input speed.

It is to be understood that the present invention may be embodied with various other changes, modifications and improvements, which may occur to those skilled in the art, without departing from the spirit and scope of the invention defined in the following claims.

What is claimed is:

1. A planetary gear type transmission including a plurality of composite planetary gears supported by a carrier such that said composite planetary gears are arranged around an axis of said carrier, each of said composite planetary gears consisting of a large pinion meshing with a common first gear, and a small pinion which has a smaller diameter than said large pinion and which meshes with a common second gear, wherein the improvement comprises:

said large and small pinions having a ratio $Zp_1/Zp_2$ which is equal to an integer not smaller than 2, wherein $Zp_1$ and $ZP_2$ represent numbers of teeth of said large and small pinions, respectively.

2. A planetary gear type transmission according to claim 1, wherein each of the teeth of said small pinion is aligned with an appropriate one of the teeth of said large pinion in a circumferential direction of said small and large pinions.

3. A planetary gear type transmission according to claim 1, wherein said ratio $Zp_1/Zp_2$ is equal to 3.

4. A planetary gear type transmission according to claim 3, wherein said number $Zp_1$ of teeth of said large pinion is equal to 24 while said number $Zp_2$ of teeth of said small pinion is equal to 8.

5. A planetary gear type transmission according to claim 1, wherein said common first gear consists of a sun gear rotatable about said axis of said carrier, while said common second gear consists of a ring gear rotatable about said axis of said carrier.

6. A planetary gear type transmission according to claim 1, wherein said common first gear consists of a stationary sun gear coaxial with said carrier, while said common second gear consists of a ring gear and a sun gear which are rotatable about said axis of said carrier.

7. A planetary gear type transmission according to claim 1, wherein said common first gear consists of a stationary sun gear coaxial with said carrier, while said common second gear consists of a sun gear rotatable about said axis of said carrier.

8. A planetary gear type transmission according to claim 1, wherein said plurality of composite planetary gears consist of three composite planetary gears.

9. A planetary gear type transmission according to claim 1, wherein said common first gear operates as an input member of the transmission.

10. A planetary gear type transmission according to claim 1, wherein said common second gear operates as an input member of the transmission.

11. A planetary gear type transmission according to claim 1, wherein said carrier operates as an input member of the transmission.

12. A method of assembling a planetary gear type transmission including a plurality of composite planetary gears supported by a carrier such that said composite planetary gears are arranged around an axis of said carrier, each of said composite planetary gears consisting of a large pinion meshing with a common first gear, and a small pinion which has a smaller diameter than said large pinion and which meshes with a common second gear, the method comprising the steps of:

preparing said each composite planetary gear such that said large and small pinions have a ratio $Zp_1/Zp_2$ which is equal to an integer not smaller than 2, wherein $Zp_1$ and $Zp_2$ represent numbers of teeth of said large and small pinions, respectively;

assembling said common second gear and said carrier supporting said plurality of composite planetary gears, such that said small pinion of said each composite planetary gear meshes with said common second gear; and assembling said common first gear and said carrier such that said large pinion of said each composite planetary gear supported by said carrier meshes with said common first gear.

\* \* \* \* \*